(12) United States Patent
Lee et al.

(10) Patent No.: US 9,360,641 B2
(45) Date of Patent: Jun. 7, 2016

(54) MULTI-WAVELENGTH OPTICAL SIGNAL RECEIVING APPARATUS AND METHOD

(71) Applicant: Electronics and Telecommunications Research Institute, Daejeon (KR)

(72) Inventors: Joon Ki Lee, Daejeon (KR); Sae-Kyoung Kang, Daejeon (KR); Joon Young Huh, Daejeon (KR)

(73) Assignee: ELECTRONICS AND TELECOMMUNICATIONS RESEARCH INSTI, Daejeon (KR)

( * ) Notice: Subject to any disclaimer, the term of this patent is extended or adjusted under 35 U.S.C. 154(b) by 0 days.

(21) Appl. No.: 14/467,283

(22) Filed: Aug. 25, 2014

(65) Prior Publication Data

US 2015/0139666 A1 May 21, 2015

(30) Foreign Application Priority Data

Nov. 19, 2013 (KR) ........................ 10-2013-0140933

(51) Int. Cl.
*G02B 6/42* (2006.01)

(52) U.S. Cl.
CPC ............ *G02B 6/4274* (2013.01); *G02B 6/4204* (2013.01); *G02B 6/4249* (2013.01)

(58) Field of Classification Search
CPC .. H04B 10/616; H04B 10/60; H04B 10/2914; H04B 10/67; H04B 10/673; H04B 10/693; H04B 10/801; H04B 10/66; H04B 10/11; H04B 10/69; H04J 14/02; H01S 5/0262; G02B 6/12007; G02B 6/4201; G02B 6/4274; G02B 6/4204; G02B 6/32

USPC .......... 398/202–204, 207, 208, 210, 79, 212, 398/164
See application file for complete search history.

(56) References Cited

U.S. PATENT DOCUMENTS

| | | | | |
|---|---|---|---|---|
| 6,792,171 B2 * | 9/2004 | Hargis | ................ | G02B 6/4204 385/14 |
| 7,046,936 B2 * | 5/2006 | Aruga | ................ | G02B 6/4201 257/431 |
| 7,177,506 B2 * | 2/2007 | Baldwin | .............. | G02B 6/4204 385/34 |
| 7,455,463 B2 * | 11/2008 | Togami | ................ | G02B 6/4277 385/14 |
| 7,764,885 B2 * | 7/2010 | Nguyen | .............. | H03F 3/45085 372/34 |
| 8,907,266 B2 * | 12/2014 | Toyonaka | ....... | H01L 31/022408 250/239 |

(Continued)

*Primary Examiner* — Hibret Woldekidan
(74) *Attorney, Agent, or Firm* — William Park & Associates Ltd.

(57) ABSTRACT

A multi-wavelength optical signal receiving apparatus receives a multi-wavelength optical signal, demultiplexes the received optical signal to convert into an electric signal. The multi-wavelength optical signal receiving apparatus includes a demultiplexing part including a demultiplexer configured to divide the received multi-wavelength optical signal into a plurality of optical signals by wavelength, a photoelectric conversion part to convert the optical signals into electric signals and amplify the electric signals, and at least one lower securing plate configured to couple the parts by an active alignment method. Accordingly, an additional polishing or coating process is not required, which simplifies the manufacturing process, and it is possible to manufacture the apparatus in blocks, thereby increasing mass-productivity.

11 Claims, 8 Drawing Sheets

(56) References Cited

U.S. PATENT DOCUMENTS

| | | | | |
|---|---|---|---|---|
| 9,046,337 B2* | 6/2015 | Flanders | ............ | G01B 9/02004 |
| 2004/0159778 A1* | 8/2004 | Sakaguchi | ............... | G01V 8/20 |
| | | | | 250/221 |
| 2004/0208653 A1* | 10/2004 | Aruga | ................... | G02B 6/4201 |
| | | | | 398/214 |
| 2007/0053690 A1* | 3/2007 | Zhu | ..................... | G02B 6/4246 |
| | | | | 398/85 |
| 2011/0058771 A1* | 3/2011 | Lee | ..................... | G02B 6/4215 |
| | | | | 385/33 |
| 2012/0057879 A1* | 3/2012 | Douma | ................ | G02B 6/4246 |
| | | | | 398/135 |
| 2012/0087678 A1* | 4/2012 | Earnshaw | ................ | G02B 6/43 |
| | | | | 398/202 |
| 2012/0128290 A1 | 5/2012 | Han et al. | | |

\* cited by examiner

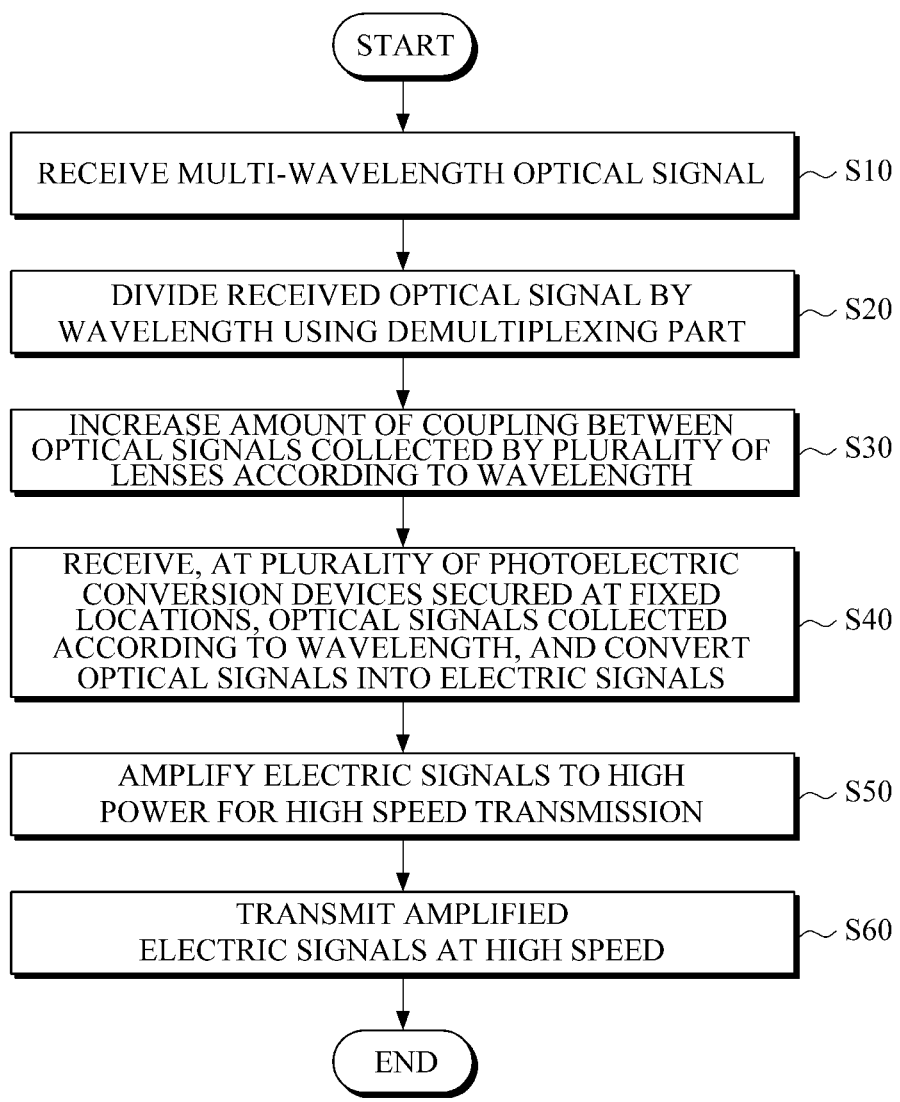

MULTI-WAVELENGTH OPTICAL SIGNAL RECEIVING APPARATUS AND METHOD

CROSS-REFERENCE TO RELATED APPLICATION(S)

This application claims priority from Korean Patent Application No. 10-2013-0140933, filed on Nov. 19, 2013, in the Korean Intellectual Property Office, the disclosure of which is incorporated herein by reference in its entirety.

BACKGROUND

1. Field

The following description relates to an optical signal receiving apparatus, and more particularly, to a multi-wavelength optical signal receiving apparatus capable of receiving a multi-wavelength optical signal and converting the optical signal into an electric signal.

2. Description of the Related Art

In a wavelength division multiplexing (WDM) scheme, a planar optical waveguide is used to divide optical signals of different wavelengths since it is easy to miniaturize the planar optical waveguide.

In a general WDM scheme, a photoelectric conversion device may be positioned on a planar waveguide, or a photoelectric conversion device and an amplification circuit may be sequentially arranged on a circuit board situated on the planar waveguide, and thus a test is only possible when all elements are assembled together, and if any defects are found, the whole assembly should be discarded.

SUMMARY

One objective of the following description is to provide a structure and method for easily manufacturing, with high mass-productivity, a large-capacity multi-wavelength optical signal receiving apparatus.

In one general aspect, there is provided a multi-wavelength optical signal receiving apparatus including: a demultiplexing part configured to comprise a demultiplexer to divide a received multi-wavelength optical signal into a plurality of optical signals by wavelength; a photoelectric conversion part configured to comprise a signal converter and a signal amplifier, wherein the signal converter is configured to receive optical signals collected according to wavelength and to convert the received optical signals into electric signals using a plurality of photoelectric conversion devices, and the signal amplifier is configured to amplify the electric signals using an amplification circuit; and at least one lower securing plate fixedly located onto a lower surface of each of the demultiplexing part and the photoelectric conversion part to couple the demultiplexing part and the photoelectric conversion part to each other, by an active alignment, at locations where a coupling amount between the optical signals is maximized.

The multi-wavelength optical signal receiving apparatus may further include a photoelectric conversion device integrated with lenses or a lens array, wherein the lenses or the lens array is coupled to at least one of the demultiplexing part and the photoelectric conversion part to receive the optical signals divided by wavelength and to collect the received optical signals according to wavelength. The signal converter may be configured to include the plurality of photoelectric conversion devices to receive the respective optical signals collected according to wavelength and to convert the received signals into electric signals; and a first circuit board configured to have the plurality of photoelectric conversion devices bonded thereon at fixed locations in alignment with locations at which the respective optical signals are collected according to wavelength, such that the collected optical signals can be delivered to the respective photoelectric conversion devices. The signal amplifier may be configured to include an amplification circuit configured to amplify the electric signal generated by the plurality of photoelectric conversion devices; and a second circuit board on which the amplification circuit is bonded and secured at a fixed location.

The photoelectric conversion part may be configured to further include an optical bench located at a side of the first circuit board and at a side of the second circuit board to allow side walls of first and second circuit boards to be coupled in a perpendicular manner. The at least one lower securing plate may couple the photoelectric conversion part and the demultiplexing part at fixed locations on a top surface thereof by an active alignment to maximize an amount of coupling between optical signals. The at least one lower securing plate may include two lower securing plates: one lower securing plate being fixed onto a lower surface of the demultiplexing part; and the other lower securing plate being fixed onto a lower surface of the photoelectric conversion part, and couple the demultiplexing part and the photoelectric conversion part by active alignment to maximize an amount of coupling between optical signals.

In another general aspect, there is provided a photoelectric conversion part of a multi-wavelength optical signal receiving apparatus, including: a signal converter configured to comprise a plurality of photoelectric conversion devices to receive optical signals collected according to wavelength and to convert the received optical signals into electric signals, and a first circuit board onto which the plurality of photoelectric conversion devices are bonded at such locations that the plurality of photoelectric conversion devices can receive the collected optical signals; and a signal amplifier configured to comprise an amplification circuit to amplify the electric signals and a second circuit board onto which the amplification circuit is bonded and secured at a fixed location.

The signal converter may be configured to include the plurality of photoelectric conversion devices to receive the optical signals collected according to wavelength and to convert the received optical signals into electric signals; and a first circuit board configured to have the plurality of photoelectric conversion devices bonded thereon at fixed locations in alignment with locations at which the respective optical signals are collected according to wavelength, such that the collected optical signals can be delivered to the respective photoelectric conversion devices.

The signal amplifier may be configured to include the amplification circuit to amplify the electric signals generated by the plurality of photoelectric conversion devices; and a second circuit board onto which the amplification circuit is bonded and secured at a fixed location. The photoelectric conversion part may further include a lens array configured to receive optical signals divided by wavelength and to collect the received optical signals according to wavelength.

The photoelectric conversion part may further include an optical bench located at a side of the first circuit board and at a side of the second circuit board to allow side walls of first and second circuit boards to touch in a perpendicular manner.

In another general aspect, there is provided a method of receiving a multi-wavelength optical signal, including: receiving the multi-wavelength optical signal; dividing the multi-wavelength optical signal by wavelength into a plurality of optical signals using a demultiplexer; increasing an amount of coupling between the divided optical signals collected by a plurality of lenses according to wavelength;

receiving and converting, at a plurality of photoelectric conversion devices, the collected optical signals into electric signals wherein the photoelectric conversion devices are located at fixed locations in alignment with locations at which the optical signals are collected according to wavelength; receiving, at an amplification circuit, the electric signals from the plurality of photoelectric conversion devices through wire connection between the amplification circuit and the plurality of photoelectric conversion devices, and amplifying the received electric signals to high power for high-speed transmission; and transmitting the amplified electric signals at high speed.

Other features and aspects will be apparent from the following detailed description, the drawings, and the claims.

BRIEF DESCRIPTION OF THE DRAWINGS

FIG. 6 is a flowchart illustrating a method of receiving a multi-wavelength optical signal according to an exemplary embodiment of the present invention.

Figure 1:
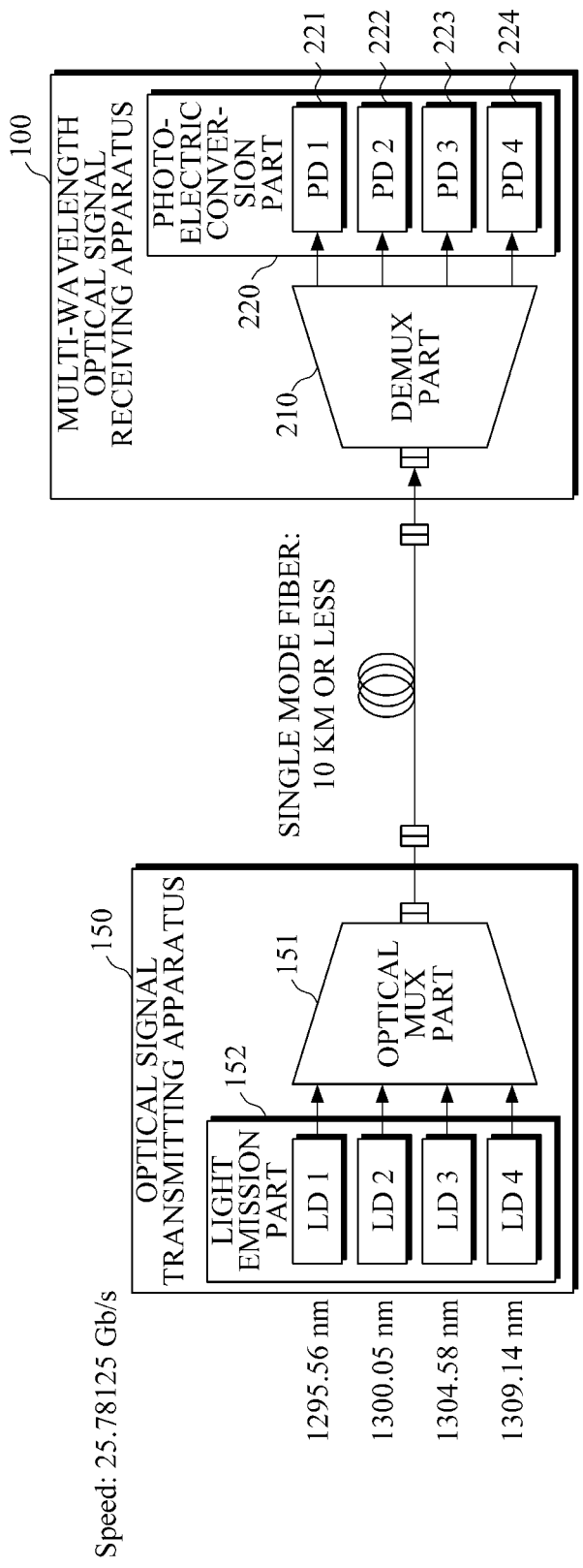
FIG. 1 is a diagram illustrating a multi-wavelength optical signal transceiver system according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a multi-wavelength optical signal transceiver system according to an exemplary embodiment.

Referring to FIG. 1, the multi-wavelength optical signal transceiver system includes a multi-wavelength optical signal transmitting apparatus 150 and a multi-wavelength optical signal receiving apparatus 100. The multi-wavelength optical signal receiving apparatus 100 may receive an optical signal that is multiplexed and transmitted from the multi-wavelength optical signal transmitting apparatus 150, and may convert the received optical signal into an electric signal.

As the amount of data to be transmitted increases with an increase in data transfer rate, the multi-wavelength optical signal transmitting apparatus 150 may employ a wavelength division multiplexing (WDM) transmission scheme, which allows several wavelength signals to be multiplexed on a single fiber.

The WDM transmission scheme is one type of optical transmission system, in which a number of channels with different optical wavelengths are combined and carried on a single optical fiber.

The WDM transmission originally aims to provide maximum utilization of a wide bandwidth. According to the existing transmission method, a fiber can carry only a single wavelength, whereas according to the WDM transmission scheme, optical signals with different wavelengths are combined into one optical signal and the combined optical signal with multiple wavelengths is transmitted through one fiber, and thereby the existing network is able to provide the same effects as if a new cable network was established. A receiving part divides the channels by wavelength, and utilizes each channel.

Such WDM transmission scheme is introduced to a field of Ethernet transmission, as well as a backbone transmission network. As a standard for transmitting 100 G Ethernet signals up to 10 km through a single-mode fiber, a scheme (100GBASE-LR4) that multiplexes four optical signals (4*25 Gb/s) of LAN-WDM wavelength at 25 Gb/s may be used.

In one example, the multi-wavelength optical signal transmitting apparatus 150 may convert four 25 Gb/s electric signals into four optical signals of LAN-WDM wavelengths in accordance with IEEE standards, that is, optical signals with wavelengths of 1295.56 nm, 1300.05 nm, 1304.58 nm, and 1309.14 nm, then transmit the optical signals through a single fiber via an optical multiplexer (WDM MUX) after wavelength division multiplexing.

In addition, in response to receiving the optical signal with four wavelengths from the optical signal transmitting apparatus 150, the multi-wavelength optical signal receiving apparatus 100 may divide the optical signal by wavelength using an optical demultiplexer (WDM DMUX), [may] convert the divided optical signals into electrical signals using photoelectric conversion devices, and [may] amplify each of the converted signals using an amplification circuit to output the electrical signals.

Figure 2:
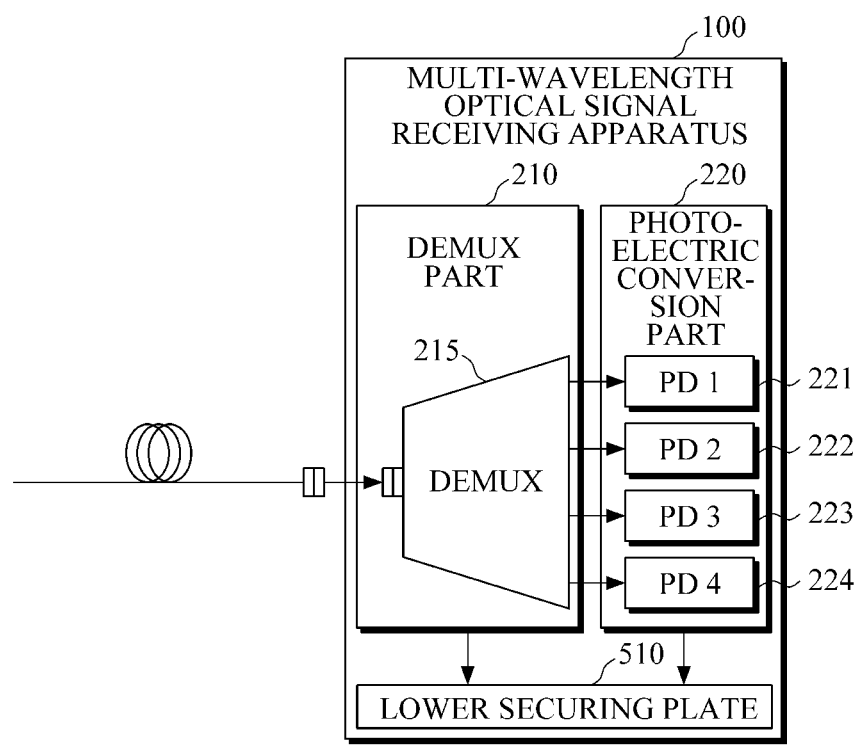
FIG. 2 is a diagram illustrating a multi-wavelength optical signal receiving apparatus of FIG. 1.

FIG. 2 is a diagram illustrating a multi-wavelength optical signal receiving apparatus of FIG. 1.

Referring to FIG. 2, the optical signal receiving apparatus 100 may include a demultiplexing part 210, a photoelectric conversion part 220, and a lower securing plate 510.

To restore original independent signals or an original group of signals, the demultiplexing part 210 may divide a composite multiplexed optical signal received from the optical signal transmitting apparatus 150 by wavelength, thereby restoring original signals of initial wavelengths.

Details of the demultiplexing part 210 will be described with reference to FIG. 3.

The photoelectric conversion part 220 may convert the received optical signal into an electrical signal, and amplify the converted electrical signal for high-speed transmission.

Details of the photoelectric conversion part 220 will be described with reference to FIG. 4.

The lower securing plate 510 may include at least one plate securely fixed onto bottom surfaces of the demultiplexing part 210 and the photoelectric conversion part 220 to couple the parts 210 and 220.

The fixation order and method of the lower securing plate 510 and the coupling between the parts will be described in detail with reference to FIGS. 5A, 5B, and 5C.

Figure 3:
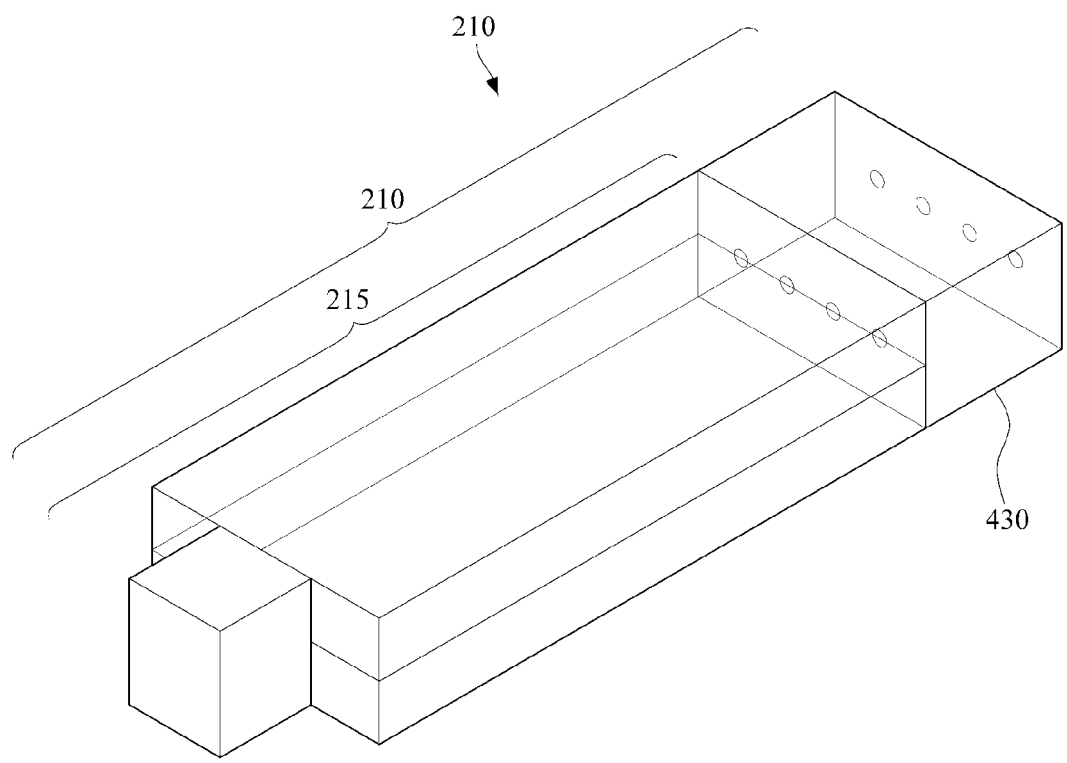
FIG. 3 is a diagram illustrating the demultiplexing part 210 of FIG. 2.

FIG. 3 is a diagram illustrating the demultiplexing part of FIG. 2.

In one example, the demultiplexing part 210 may receive a multiplexed optical signal from the optical signal transmitting apparatus 150 through the demultiplexer 215, divide the received optical signal by wavelength, and deliver the divided optical signals to the photoelectric conversion part 220.

The demultiplexer 215 may include a focus lens and an optical waveguide. The focus lens receives a multiplexed optical signal from the optical signal transmitting apparatus 150, and the optical waveguide divides the optical signal received from the focus lens by wavelength.

In another example, if an optical fiber is directly connected to the optical waveguide, a fiber array block (FAB) may be used instead of the focus lens.

The optical waveguide may be, but without limitation, a planar optical waveguide.

Figure 4:
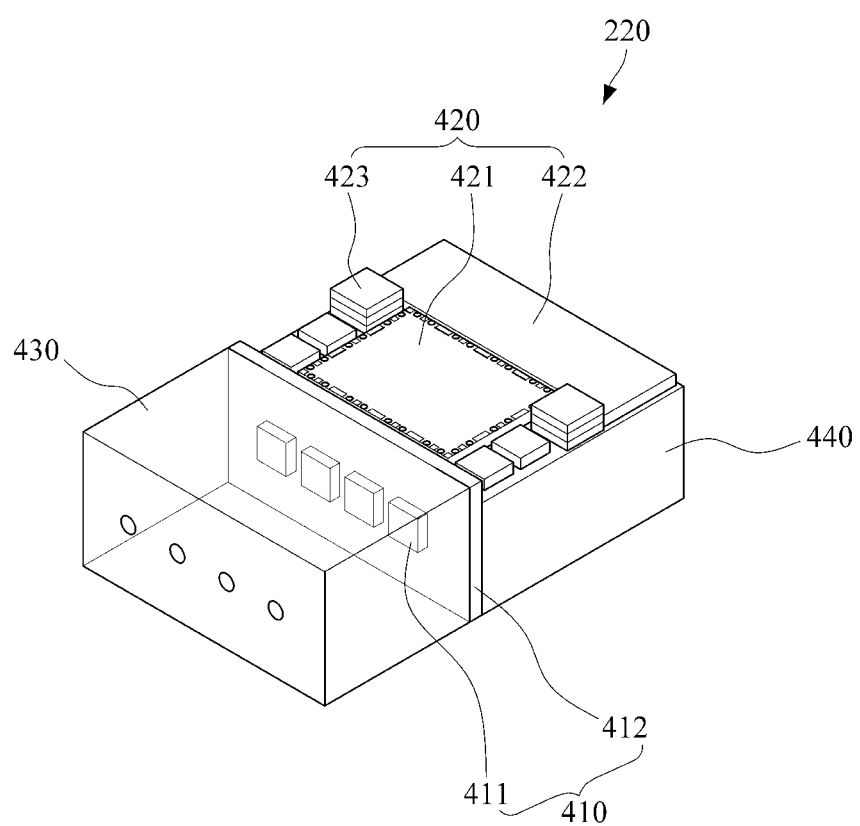
FIG. 4 is a diagram illustrating the photoelectric conversion part of FIG. 2.

FIG. 4 is a diagram illustrating the photoelectric conversion part of FIG. 2.

The photoelectric conversion part 220 may include a signal converter 410 and a signal amplifier 420, and may further include a lens array 430 and an optical bench 440.

The signal converter 410 may include a plurality of photoelectric conversion devices 411 and a first circuit board 412, and may receive optical signals collected on the lens array 430 and convert the optical signals into electrical signals.

The lens array 430 may collect optical signals, which have been divided by wavelength through the demultiplexer 215, and deliver the collected optical signals to the photoelectric conversion devices 411, and may include a plurality of lens arranged at such locations that the plurality of lens can collect the optical signals from the demultiplexer 215 according to wavelength.

In one example, since the demultiplexer 215 delivers optical signals according to wavelength, the lens array 430 may include a number of lenses corresponding to the number of wavelengths.

The lens array 430 may be included in either the photoelectric conversion part 220 or the demultiplexing part 210, or may be included in both the demultiplexing part 210 and the photoelectric conversion part 220 to form a two-lens system, providing a high efficiency of concentration.

In addition, a simpler structure may be possible by using the photoelectric conversion device 411 in which lenses are integrated, rather than using the lens array 430.

The photoelectric conversion device converts an optical signal into an electric signal.

Generally, a device that converts light into an electric signal utilizes photoelectric effect of a material, and the photoelectric effect may be classified as a photoconductive effect, inner photoelectric effect of photovoltaic effects, or external photoelectric effect from emitted photoelectrons. Various sensor devices are formed according to the use of these effects.

Devices that use inner photoelectric effect may include, without limitation, a photoconductive sensor, a photodiode, a phototransistor, a solar cell, a photoconductive image sensor, a charge-coupled device (CCD) image sensor, and the like. Devices that use external photoelectric effect may include, without limitation, a photoelectric tube, a photomultiplier tube, a photoelectron emission image sensor, and the like.

In one example, any type of photoelectric conversion device may be used as long as it can convert a received optical single into an electric signal using photoelectric effect.

The first circuit board 412 may have a plurality of photoelectric conversion devices 411 bonded thereon, and be fixed at a location that allows the photoelectric conversion devices 411 to be able to receive the optical signals collected by the lens array 430.

In addition, the first circuit board may be formed of ceramic, but the material of the first circuit board is not limited thereto.

The first circuit board 412 may have a signal pattern on a side wall, and an electric connection between the pattern and TIA may be established via wire bonding.

The signal amplifier 420 may receive the electric signal generated by the signal converter 410, and amplify the received electric signal for high-speed transmission. The signal amplifier 420 may include an amplification circuit 421 and a second circuit board 422.

Here, the amplification circuit 421 is an electronic circuit that amplifies a voltage, current, and power of an input signal to generate an output signal, and in the example, a transimpedance amplifier may be used as the amplification circuit 421.

Further, the second circuit board may be made of ceramic, but the material of the second circuit board is not limited thereto, and the second circuit board may further include a storage battery to reduce noise from operating power of the amplification circuit 421.

The optical bench 440 may be located at a side of the first circuit board and at a side of the second circuit board to allow a side wall of the first circuit board in the signal converter 410 and a side wall of the second circuit board in the signal amplifier 420 to be coupled to each other in a perpendicular manner.

Figure 5A:
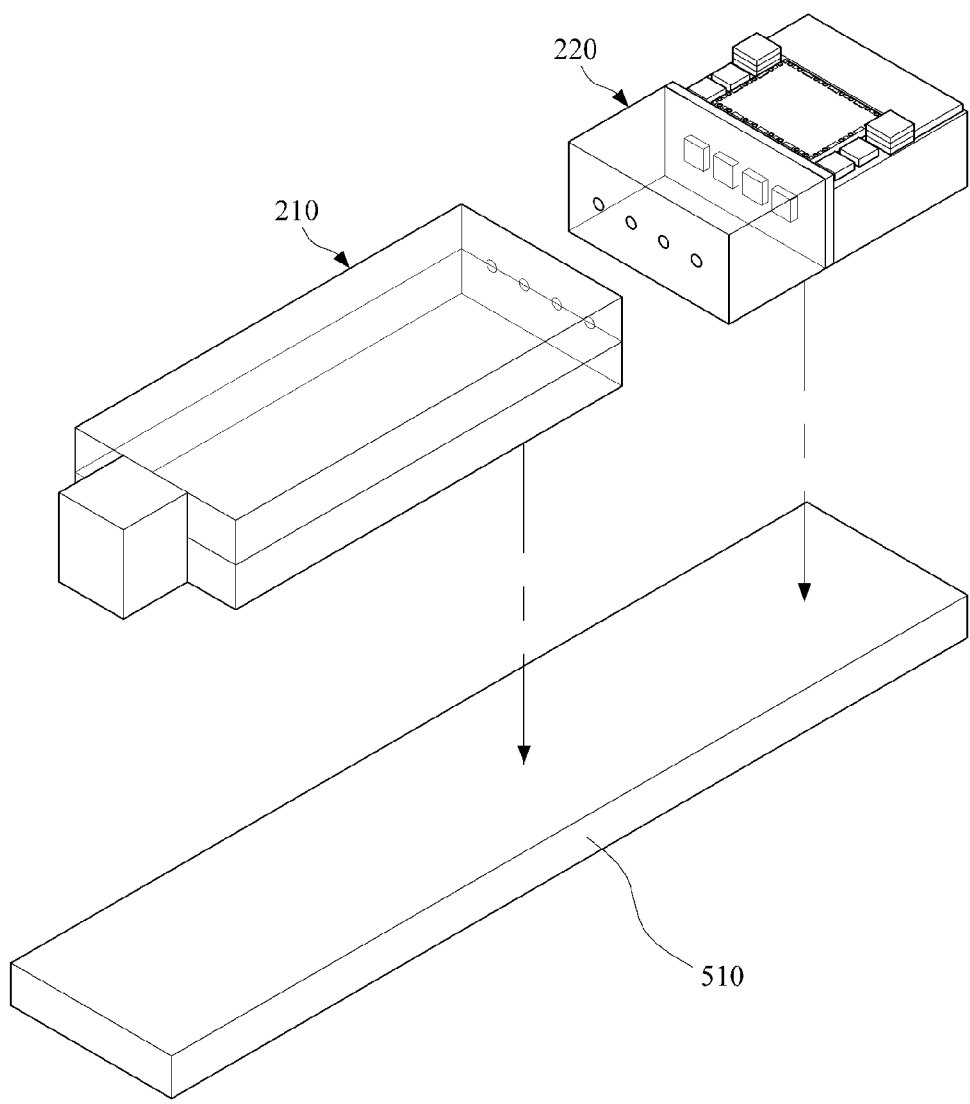
FIG. 5A is a diagram illustrating a multi-wavelength optical signal receiving apparatus that includes a demultiplexing part, a photoelectric conversion part with a lens array, and one lower securing plate onto which the demultiplexing part and the photoelectric conversion part are coupled to each other, according to an exemplary embodiment of the present invention.

FIG. 5A is a diagram illustrating a multi-wavelength optical signal receiving apparatus that includes a demultiplexing part, a photoelectric conversion part with a lens array, and one lower securing plate onto which the demultiplexing part and the photoelectric conversion part are coupled to each other, according to an exemplary embodiment of the present invention.

Referring to FIG. 5A, the demultiplexing part 210 and the photoelectric conversion part 220 are fixed onto the single lower securing plate 510, and thereby they can be coupled to each other onto the lower securing plate 510.

In this case, the coupling may be performed in such a manner that the photoelectric conversion part 220 including the lens array 430 is coupled to a rear portion of the securing plate 510, and then the demultiplexing part 210 is fixed at a location in a front portion of the lower securing plate 510 where the coupling amount in each of the plurality of photoelectric conversion devices 411 is maximized by the lens array 430.

In addition, the demultiplexing part 210 may be fixed in the front portion of the lower securing plate 510, and the photoelectric conversion part 220 is fixed at a location in the rear portion where the amount of coupling between optical signals is maximal.

Further, the demultiplexing part 210 and the photoelectric conversion part 22 may be first coupled to each other, and then the coupled part may be secured on the lower securing plate.

The location where the amount of coupling is maximized may be determined by an active alignment method.

The active alignment refers to a method of aligning beam patterns by analyzing the intensity and beam patterns of optical signals to determine a distance and location at which an optical power of optical signals, that is, the amount of coupling between optical signal from the demultiplexing part 210 and an optical signal from the photoelectric conversion part 220 is maximal.

Figure 5B:
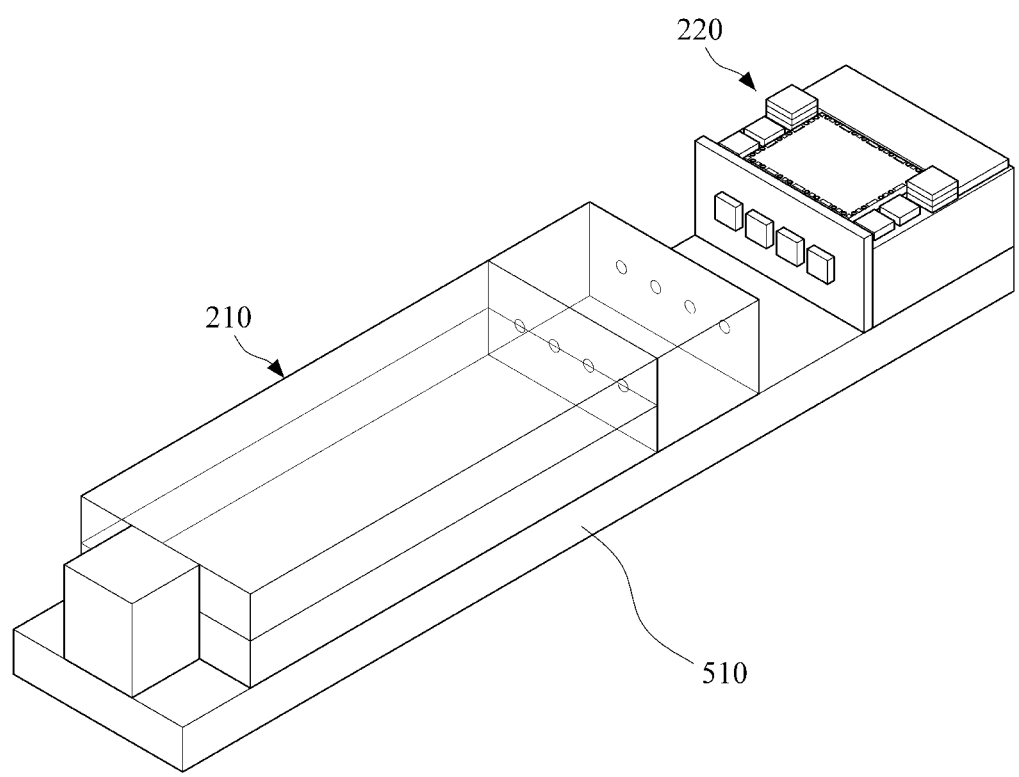
FIG. 5B is a diagram illustrating a multi-wavelength optical signal receiving apparatus that includes a demultiplexing part with a lens array, a photoelectric conversion part, and one lower securing plate onto which the demultiplexing part and the photoelectric conversion part are coupled together, according to an exemplary embodiment of the present invention.

FIG. 5B is a diagram illustrating a multi-wavelength optical signal receiving apparatus that includes a demultiplexing part with a lens array, a photoelectric conversion part, and one lower securing plate through which the demultiplexing part and the photoelectric conversion part are coupled together, according to an exemplary embodiment of the present invention.

Referring to FIG. 5B, the demultiplexing part 210 with the lens array 430 and the photoelectric conversion part 220 are coupled to each other by an active alignment, as shown in FIG. 5A.

Figure 5C:
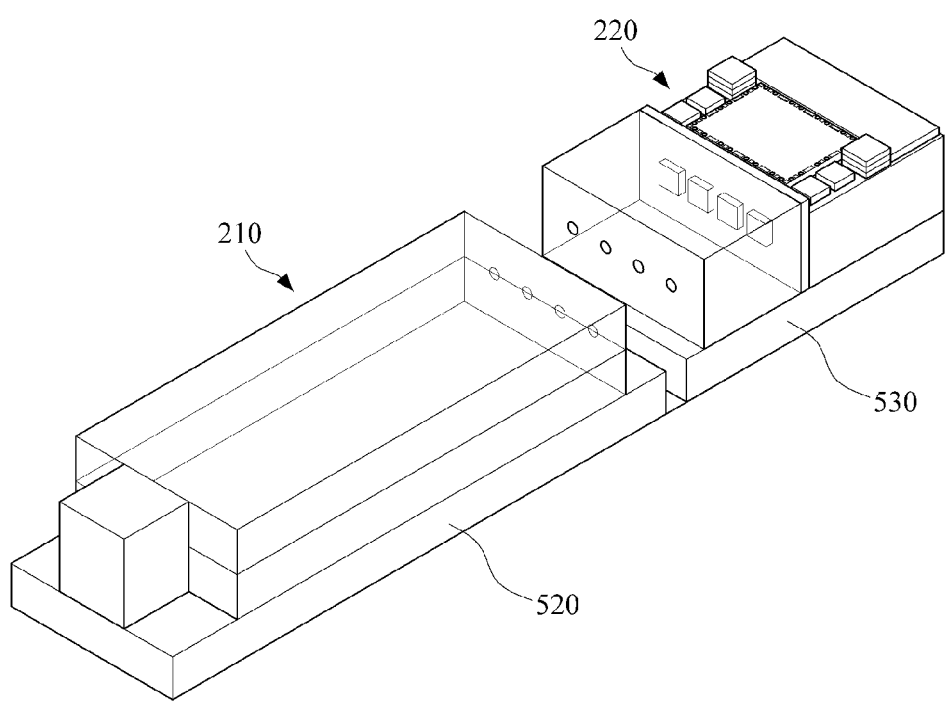
FIG. 5C is a diagram illustrating a multi-wavelength optical signal receiving apparatus that includes a demultiplexing part, a photoelectric conversion part with a lens array and two lower securing plates onto which the demultiplexing part and the photoelectric part are coupled together, according to an exemplary embodiment of the present invention.

FIG. 5C is a diagram illustrating a multi-wavelength optical signal receiving apparatus that includes a demultiplexing part, a photoelectric conversion part with a lens array and two lower securing plates onto which the demultiplexing part and the photoelectric part are coupled together, according to an exemplary embodiment of the present invention.

Referring to FIG. 5C, the two lower securing plates include a first lower securing plate 520 on which the demultiplexing part 210 is fixed, and a second lower securing plate 530 on which the photoelectric conversion part 220 is fixed, and it is possible to connect and couple the demultiplexing part 210 and the photoelectric conversion part 220 through an active alignment of the two plates 510 and 520, such that the amount of coupling between optical signals is maximized.

FIG. 6 is a flowchart illustrating a method of receiving a multi-wavelength optical signal according to an exemplary embodiment of the present invention.

Referring to FIG. 6, in S10, a multi-wavelength optical signal is received.

The multi-wavelength optical signal refers to a single signal having a plurality of wavelengths multiplexed by a multi-wavelength optical signal transmitting apparatus 150 (refer to FIG. 1).

In S20, the multi-wavelength optical signal is divided by wavelength by a demultiplexing part.

In S30, a plurality of lenses in a lens array collects the respective wavelength-divided optical signals to maximize the amount of coupling between the optical signals.

"The amount of coupling" refers to the amount of optical signals that reach and are collected on a plurality of photoelectric conversion devices, that is, transmission efficiency, and when the amount of coupling is maximized, the transmission efficiency of an optical signal to the photoelectric conversion devices is maximized.

In S40, the plurality of photoelectric conversion devices are fixedly located on a top surface of the circuit board in alignment with the locations at which the optical signals are collected, and they receive the respective optical signals and convert the received signals into electric signals.

The plurality of photoelectric conversion devices may be fixed at locations on a transmission path of the optical signals so as to receive the respective optical signals collected by the lens array according to wavelength.

In S50, an amplification circuit, which is connected with the plurality of photoelectric conversion devices via wire, may receive the electric signals generated by the photoelectric conversion devices in a signal converter, and amplifies the received electric signals to high power for high-speed transmission.

The amplification circuit is an electronic circuit that amplifies a voltage, current, and power of an input signal to generate an output signal, and in the example, a transimpedance amplifier may be used as the amplification circuit.

In this case, transmission of electric signals through a wire connection between the amplification circuit and the plurality of photoelectric conversion devices may be performed in such a manner that a side wall of a first circuit board including the plurality of photoelectric conversion devices and a side wall of a second circuit board with the amplification circuit thereon are coupled to each other in a perpendicular manner, and an electric connection between the signal patterns formed on the side walls of the first and second circuit boards and the amplification circuit is established through a wire bonding therebetween.

In S60, the amplified electric signals are transmitted at high speed.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-wavelength optical signal receiving apparatus comprising:
    a demultiplexing part configured to comprise a demultiplexer to divide a received multi-wavelength optical signal into a plurality of optical signals by wavelength;
    a photoelectric conversion part configured to comprise a signal converter and a signal amplifier,
    wherein the signal converter is configured to comprise a plurality of photoelectric conversion devices to receive optical signals collected according to wavelength and to convert the received optical signals into electrical signals, and a first circuit board onto which the plurality of photoelectric conversion devices are bonded at such locations that the plurality of photoelectric conversion devices can receive the collected optical signals and the signal amplifier is configured to comprise an amplification circuit to amplify the electric signals and a second circuit board onto which the amplification circuit is bonded and secured at a fixed location; and
    at least one lower securing plate fixedly located onto a lower surface of each of the demultiplexing part and the photoelectric conversion part to couple the demultiplexing part and the photoelectric conversion part to each other, by an active alignment, at locations where an amount of coupling between the optical signals is maximized,
    wherein the photoelectric conversion part is configured to further comprise an optical bench located at a side of the first circuit board and at a side of the second circuit board to allow side walls of the first and the second circuit boards to be coupled in a perpendicular manner.

2. The multi-wavelength optical signal receiving apparatus of claim 1, further comprising:
one of the photoelectric conversion devices integrated with lenses or a lens array wherein
the lenses or the lens array is coupled to at least one of the demultiplexing part and the photoelectric conversion part to receive the optical signals divided by wavelength and collect the received optical signals according to wavelength.

3. The multi-wavelength optical signal receiving apparatus of claim 1, wherein the signal converter is configured to comprise: the plurality of photoelectric conversion devices to receive the respective optical signals collected according to wavelength and to convert the received signals into electric signals; and
the first circuit board configured to have the plurality of photoelectric conversion devices bonded thereon at fixed locations in alignment with locations at which the respective optical signals are collected according to wavelength, such that the collected optical signals can be delivered to the respective photoelectric conversion devices.

4. The multi-wavelength optical signal receiving apparatus of claim 1, wherein the signal amplifier is configured to comprise:
an amplification circuit configured to amplify the electric signal generated by the plurality of photoelectric conversion devices; and
the second circuit board on which the amplification circuit is bonded and secured at a fixed location.

5. The multi-wavelength optical signal receiving apparatus of claim 1, wherein the at least one lower securing plate couples the photoelectric conversion part and the demultiplexing part at fixed locations on a top surface thereof by an active alignment to maximize an amount of coupling between optical signals.

6. The multi-wavelength optical signal receiving apparatus of claim 1, wherein the at least one lower securing plate comprises two lower securing plates: one lower securing plate being fixed onto a lower surface of the demultiplexing part; and the other lower securing plate being fixed onto a lower surface of the photoelectric conversion part, and couples the demultiplexing part and the photoelectric conversion part by active alignment to maximize an amount of coupling between optical signals.

7. A photoelectric conversion part of a multi-wavelength optical signal receiving apparatus, comprising:
a signal converter configured to comprise a plurality of photoelectric conversion devices to receive optical signals collected according to wavelength and to convert the received optical signals into electric signals, and a first circuit board onto which the plurality of photoelectric conversion devices are bonded at such locations that the plurality of photoelectric conversion devices can receive the collected optical signals; and
a signal amplifier configured to comprise an amplification circuit to amplify the electric signals and a second circuit board onto which the amplification circuit is bonded and secured at a fixed location,
wherein the photoelectric conversion part is configured to further comprise an optical bench located at a side of the first circuit board and at a side of the second circuit board to allow side walls of the first and the second circuit boards to be coupled in a perpendicular manner.

8. The photoelectric conversion part of claim 7, wherein the signal converter is configured to comprise
the plurality of photoelectric conversion devices to receive the optical signals collected according to wavelength and to convert the received optical signals into electric signals; and
the first circuit board configured to have the plurality of photoelectric conversion devices bonded thereon at fixed locations in alignment with locations at which the respective optical signals are collected according to wavelength, such that the collected optical signals can be delivered to the respective photoelectric conversion devices.

9. The photoelectric conversion part of claim 7, wherein the signal amplifier is configured to comprise the amplification circuit to amplify the electric signals generated by the plurality of photoelectric conversion devices; and the second circuit board onto which the amplification circuit is bonded and secured at a fixed location.

10. The photoelectric conversion part of claim 7, further comprising:
a lens array configured to receive optical signals divided by wavelength and collect the received optical signals according to wavelength.

11. A method of receiving a multi-wavelength optical signal, comprising:
receiving the multi-wavelength optical signal;
dividing the multi-wavelength optical signal by wavelength into a plurality of optical signals using a demultiplexer;
increasing an amount of coupling between the divided optical signals collected by a plurality of lens according to wavelength;
receiving and converting, at a plurality of photoelectric conversion devices, the collected optical signals into electric signals wherein the photoelectric conversion devices are located at fixed locations in alignment with locations at which the optical signals are collected according to wavelength;
receiving, at an amplification circuit, the electric signals from the plurality of photoelectric conversion devices through wire connection between the amplification circuit and the plurality of photoelectric conversion devices, and amplifying the received electric signals to a predetermined level of power for transmission at a predetermined speed; and
transmitting the amplified electric signals at the predetermined speed,
wherein the photoelectric conversion devices and the amplification circuit is coupled in a perpendicular manner.

* * * * *